Figure 1:
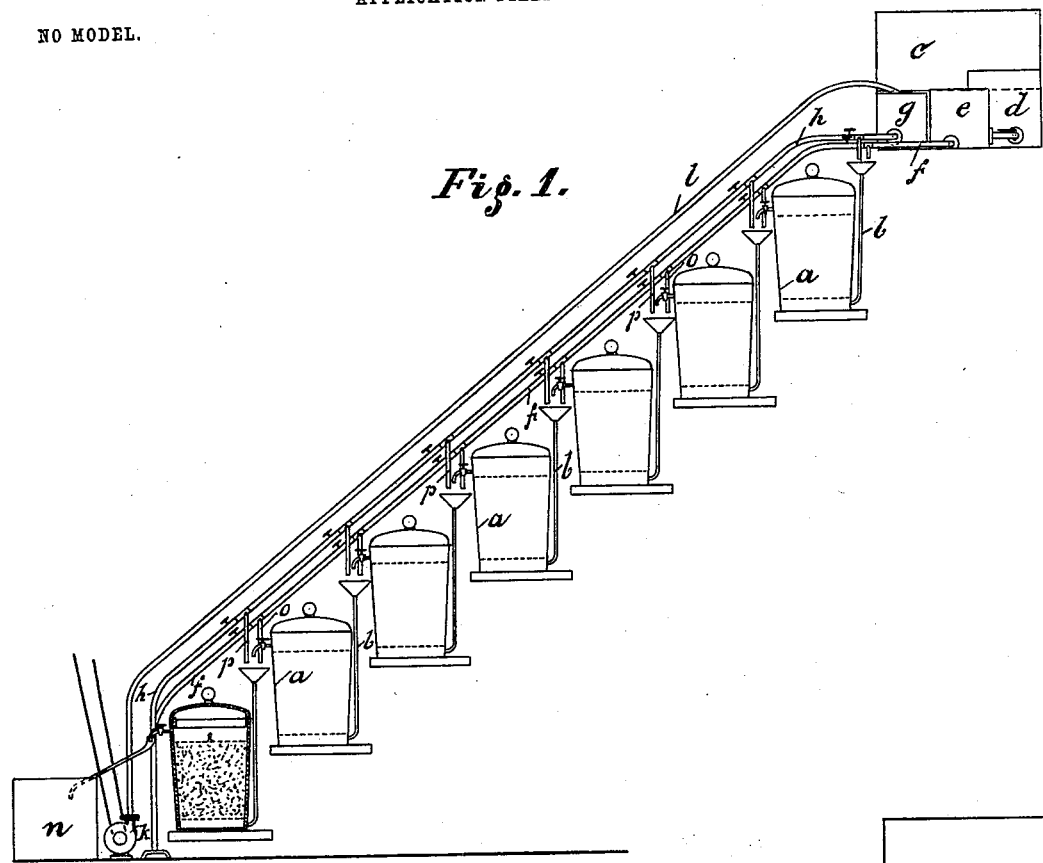

No. 731,028. PATENTED JUNE 16, 1903.
H. ESCHWEGE.
APPARATUS FOR THE MANUFACTURE OF EXTRACT OF COFFEE.
APPLICATION FILED FEB. 6, 1902.
NO MODEL.

WITNESSES:
Isabella Waldron
Adelaide Blair Gleason

INVENTOR.
Hermann Eschwege
BY
Richardson
ATTORNEYS

No. 731,028. Patented June 16, 1903.

UNITED STATES PATENT OFFICE.

HERMANN ESCHWEGE, OF FOREST HILL, ENGLAND.

APPARATUS FOR THE MANUFACTURE OF EXTRACT OF COFFEE.

SPECIFICATION forming part of Letters Patent No. 731,028, dated June 16, 1903.

Application filed February 6, 1902. Serial No. 92,867. (No model.)

*To all whom it may concern:*

Be it known that I, HERMANN ESCHWEGE, manufacturer, of Sunnyside, Mayow road, Forest Hill, in the county of Kent, England, have invented certain Improvements in Apparatus for the Manufacture of Extract of Coffee, of which the following is a specification.

This invention has for its object an apparatus for the continuous manufacture of coffee extract.

As described in Patent No. 686,689, concentrated coffee extract may be obtained by passing extracting water successively through a number of open vats containing the ground coffee, said water entering each separate vessel beneath the coffee, rising upwardly through the coffee, flowing out of the vessel through a pipe at the upper edge, and at once passing into the inlet-pipe of the next extracting vessel. In order that the coffee extract, which is gradually increasing in strength, may pass automatically from one vessel to the next, the open vessels containing the ground coffee are so erected in a stepwise arrangement that the liquid may flow by gravitation from one vessel to the next, and the inlet-pipe of each extracting vessel is carried outside to a point above the upper edge of said vessel and is there provided with a funnel-shaped enlargement, which stands a short distance away from the discharge-nozzle of the next highest vessel. Now I have found that with this erection and arrangement of the vessels an apparatus may be created by the addition of certain pipes, vessels, and subsidiary apparatus which makes it technically possible to shut the coffee-containers separately out of the series as soon as they are exhausted, discharge them, refill them, and again connect them up without interrupting the working of the other containers and without any alteration taking place as regards the number of the containers at work, so that the strength of the coffee extract may remain unaltered.

My invention consists, first, in arranging a pipe beside the containers or vessels from which any suitable vessel may be first fed with fresh extracting water; secondly, in arranging a vat above the extracting vessel which stands at the highest level and another vat beneath the vessel standing at the lowest level and a pump adapted to lift the contents of the lower vessel into the upper vessel; thirdly, in arranging an overflow-pipe from the upper vessel, by means of which the liquid extract contained in the said vessel can be first conveyed to any one of the extracting vessels, and, fourthly, in increasing the number of stages of extracting vessels necessary for making the strongest extract by at least one stage.

Figure 2:
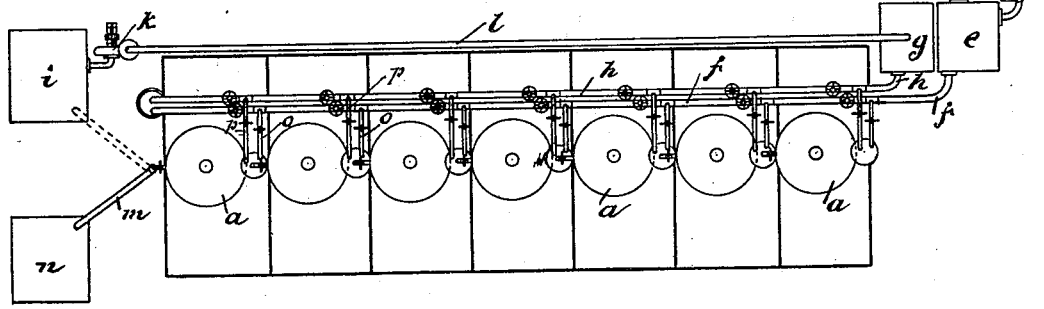

In the accompanying drawings, Figure 1 is a side view of the apparatus, and Fig. 2 a plan view of the same.

In the case shown in the drawings it is assumed that the passage of water through six extracting vessels suffices for obtaining the strongest desirable coffee extract. Consequently seven stages are provided. Each extracting vessel consists of an open tank $a$, provided, if desired, with a loose cover, and in which tanks sieves are arranged, one close above the bottom and the other near the overflow. Between these sieves, which are shown by dotted lines in the drawings, the ground coffee is placed. The inflow-pipe $b$ of each extracting vessel, which is carried up toward the overflow-pipe of the preceding vessel, connects with the former vessel beneath the lower sieve. Above the highest extracting vessel a large tank $c$ for cold water is arranged. A tank $d$, provided with a heating-coil, is fed from this tank $c$, and the extracting water is brought to a suitable temperature (30° to 40° centigrade) by the inflowing of cold and hot water into a third tank $e$. From this tank $e$ a pipe $f$, having a fall suited to the arrangement of the steps, leads down to the extracting vessel situated at the lowest stage, and this pipe $f$ is provided with a connection $o$, communicating with each extracting vessel and adapted to be closed by means of a tap, which connections open above the collecting-funnels of the inlet-pipes $b$ of each vessel, so that thus each separate extracting vessel may be fed with fresh water. Further, another tank $g$ is situated at the same height as the tank $e$, containing the extracting water, and said tank $g$ is provided with a discharge-pipe $h$, similar to that of the tank $e$, upon which pipe $h$ also discharge-nozzles $p$, adapted to be closed by means of taps, are provided near each extracting vessel, said nozzles discharging close above the collecting-funnels of the inlet-pipes $b$, so that each separate extracting vessel may be fed independently from the tank $g$.

Below the extracting vessel situated on the lowest stage a tank $i$ is arranged, with which the suction-pipe of a pump $k$ connects. The pressure-pipe $l$ of this pump leads to the tank $g$, so that the coffee extract flowing from the lowest extracting vessel may be lifted into the tank $g$ and from the latter may be again conveyed to any one of the extracting vessels of the series.

The arrangement hereinbefore described enables the working to be carried out uninterruptedly in the following manner: Assuming that an extract of the strongest concentration is to be produced, the six upper extracting vessels are filled with ground coffee and the suitably-tempered extracting water is conveyed to the inlet of the uppermost vessel. The other taps of the water-pipe $f$ remain closed. A detachable pipe (not shown in the drawings) is connected to the discharge-tap of the sixth extracting vessel, which pipe conveys the extract discharged from this vessel to a collecting-vat $n$, from which the finished coffee extract may be filled into bottles or the like. It is evident without further explanation that the uppermost extracting vessel will be the first to be exhausted. As soon as this is the case the previously-mentioned pipe connected to the tap of the sixth vessel is removed, so that the sixth vessel discharges then into the inlet of the seventh vessel, which in the meantime has been charged with freshly-ground coffee. The water-feed tap of the first (uppermost) vessel is then closed and simultaneously that of the second vessel is opened. There are now, as before, six extracting vessels in action, and the finished coffee extract is discharged from the lowest extracting vessel. This extract flows through the pipe $m$, attached to the tap of this lowest vessel, into the collecting-vat $n$. The coffee-grounds or used coffee is then removed from the uppermost vessel, and said vessel is cleared and filled with fresh coffee. As soon as the second vessel is exhausted the water-feed tap of the same is closed and the water-feed tap of the third vessel opened, and the coffee extract flowing from the lowest vessel is collected to a certain extent in the tank $i$ by means of the pipe $m$, which is diverted to this tank, and then the pump $k$ is set in action and the coffee extract contained in the tank $i$ is elevated to the tank $g$. The tube-socket $p$, leading to the inlet of the uppermost extracting vessel beneath the discharge-pipe $h$ of this tank $g$, is then opened, so that the coffee extract elevated from the tank $i$ to the tank $g$ may now flow through the extracting vessel situated on the uppermost stage, which thus acts as the sixth vessel, and this uppermost vessel supplies the finished coffee extract, which is conveyed to the collecting-tank $n$ by a suitable pipe (not shown in the drawings) from the discharge-tap of this vessel. The second extracting vessel from the top is then discharged, refilled, and again set in operation as soon as the third vessel from the top is shut off, and the fourth vessel is made the first in use in the series. This apparatus thus renders possible the manufacture of a coffee extract of the strongest concentration in an uninterrupted operation without any alteration of the position of the extracting vessels, which always require to be recharged successively, and this is of considerable importance for working on a wholesale scale, as each separate extracting vessel, particularly in a filled condition, is of considerable weight, and by this arrangement also a uniform maximum production can be insured. If coffee extract of a lesser degree of concentration is to be produced, a correspondingly-smaller number of the extracting vessels arranged in series is brought into action.

I declare that what I claim is—

The combination of a graded series of coffee-extracting vessels having open inlet-pipes, with a surplus-coffee-extracting vessel arranged on a supplementary stage, a water-feed pipe, nozzles connected to said water-feed pipe and communicating with each extracting vessel, means for separately shutting off said nozzles, and extract-feed pipe, nozzles connected to said extract-feed pipe and communicating with each extracting vessel, means for separately shutting off said nozzles, a lower extract-collecting tank, an upper exhaust-collecting tank, and a pump adapted to forward the extract from said lower tank into said upper tank.

In witness whereof I have hereunto set my hand in presence of two witnesses.

HERMANN ESCHWEGE.

Witnesses:
I. PHILLIPS CRAWLEY,
W. Z. WILSON.